United States Patent Office 3,523,940
Patented Aug. 11, 1970

3,523,940
PREPARATION OF LACTAMS AND KETONES BY REACTION OF CARBON MONOXIDE WITH A NITROCYCLOALKANE
John W. Churchill, Mount Carmel, Conn., William E. Hanford, New York, N.Y., and Ehrenfried H. Kober, Hamden, Conn., assignors to Olin Mathieson Chemical Corporation, a corporation of Virginia
No Drawing. Filed Apr. 6, 1967, Ser. No. 628,810
Int. Cl. C07d 41/06
U.S. Cl. 260—239.3
9 Claims

ABSTRACT OF THE DISCLOSURE

Lactams and ketones of cycloalkanes are prepared by reacting in a one-step process, a nitrocycloalkane with carbon monoxide in the presence of a carbonyl of iron, cobalt, nickel or of metals selected from Groups V–B and VI–B of the Periodic Table. Temperatures ranging from about 20° C. to about 250° C. and pressures ranging from atmospheric to 2000 p.s.i.g. may be utilized.

---

This invention relates to a method for the production of lactams and ketones. More specifically, this invention relates to a one-step method for the preparation of lactams or ketones and mixtures thereof by reaction of carbon monoxide with a nitrocycloalkane in the presence of a metal carbonyl catalyst.

Lactams, such as the well known caprolactam, are used to produce polyamides suitable for manufacturing fabrics, coating compositions, fibers and the like. Heretofore, caprolactam and other lactams, have been manufactured by Beckmann rearrangement of the corresponding ketoximes. For example, caprolactam, which is the most important lactam commercially, has long been prepared by rearrangement of cyclohexanone oxime. The rearrangement may be effected with acids, such as strong sulfuric acid or catalytically over a dehydration catalyst.

A number of processes in the art are known for preparing cyclohexanone oxime. For example, processes which involve treating nitrocyclohexane or its salts with hydroxylamine, hydrogen, ammonia, amines, sulfides, alkylene oxides, etc. have been described in detail. The oxime can also be produced by treating cyclohexanone with hydroxylamine, by treatment of cyclohexanone-bi-sulfite complexes with nitrous acid and by similar well-known methods. Although lactams prepared by the multi-step processes described above are satisfactory for conversion into polymers, the art has long recognized the need for a single-step method by which lactams could be prepared in a single reaction.

It has been found that the foregoing objects can be accomplished by reacting carbon monoxide with a nitrocycloalkane in the presence of a metal carbonyl catalyst.

In conducting the process of this invention the temperature employed can be varied widely. Generally, it will range from about 20° C. to about 250° C. and preferably will be from about 60° C. to about 150° C. Although the reaction can be conveniently carried out at atmospheric pressure, if desired, pressures ranging up to about 2000 p.s.i.g. or more can be employed. Usually, the reaction pressure will be from about atmospheric pressure to about 500 p.s.i.g.

The reaction time will vary over a wide range and is dependent upon the processing conditions employed as well as a particular nitrocycloalkane compound being reacted. Usually between about 2 to about 30 hours are required to obtain a satisfactory degree of reaction, however, shorter or longer reaction times may be employed.

A wide variety of nitrocycloalkane compounds are suitable as starting materials in the novel process of this invention. They include, for example, nitrocyclobutane, nitrocyclopentane, nitrocyclohexane, nitrocycloheptane, nitrocyclodecane, nitrocyclotetradecane, bis(nitrocylo-hexyl) methanes, etc. The nitro group present in the nitrocycloalkanes useful as starting materials in the process of this invention is a secondary nitro group.

The nitrocycloalkane starting materials may be substituted with one or more additional substitutents such as alkyl, alkenyl, alkoxy, aryloxy, halogen, alkylthio, arylthio, carboxyalkyl, cyano and the like. Examples of suitable substituted nitrocycloalkanes which can be employed include:

(1) 1-fluoro-2-nitrocyclobutane
(2) 1-chloro-2-nitrocyclobutane
(3) 1-iodo-3-nitrocyclobutane
(4) 1-methyl-2-nitrocyclobutane
(5) 1-ethyl-3-nitrocyclobutane
(6) 1-hexyl-3-nitrocyclobutane
(7) 1-cyano-2-nitrocyclobutane
(8) 1-methoxy-2-nitrocyclobutane
(9) 1-bromo-3-nitrocyclopentane
(10) 1-fluoro-2-nitrocyclopentane
(11) 1-butoxy-3-nitrocyclopentane
(12) 1-carboxyethyl-3-nitrocyclopentane
(13) 1-ethylthio-3-nitrocyclopentane
(14) 1-chloro-2-iodo-3-nitrocyclopentane
(15) 1-methoxy-2-nitrocyclohexane
(16) 1-ethoxy-4-nitrocyclohexane
(17) 1-butenyl-2-nitrocyclohexane
(18) 1-phenoxy-3-nitrocyclohexane
(19) 1-iodo-3-nitrocyclohexane
(20) 1-chloro-4-nitrocyclohexane
(21) 1-cyano-2-nitrocyclohexane
(22) 1-cyano-3-chloro-4-nitrocyclohexane
(23) 1-ethoxy-4-iodo-5-nitrocyclohexane
(24) 1-ethylthio-3-nitrocyclohexane
(25) 1-carboxylbutyl-3-nitrocyclohexane
(26) 1-phenylthio-4-nitrocyclohexane
(27) 1-carboxymethyl-3-nitrocyclohexane
(28) 1-methyl-3-nitrocyclohexane
(29) 1-phenoxy-4-nitrocyclooctane
(30) 1-carboxylmethyl-2-chloro-4-nitrocyclooctane
(31) 1-ethyl-4-nitrocyclodecane
(32) 1-cyano-5-nitrocyclodecane
(33) 1-propenyl-6-nitrocyclodecane
(34) 1-phenoxy-7-nitrocyclodecane
(35) 1-carboxylbutyl-6-nitrocyclodecane
(36) 1-fluoro-3-chloro-4-nitrocyclododecane
(37) 1-chloro-3-nitrocyclododecane
(38) 1-carboxylmethyl-4-nitrocyclododecane
(39) 1-methylthio-4-nitrocyclododecane
(40) 1-butenyl-4-nitrocyclododecane
(41) 1-cyano-2-nitrocyclododecane
(42) 1-phenoxy-2-nitrocyclododecane
(43) 1-methylthio-5-nitrocyclotetradecane
(44) 1-propenyl-4-nitrocyclotetradecane
(45) 1-phenoxy-7-nitrocyclotetradecane
(46) 1-butenyl-4-nitrocyclotetradecane
(47) 1-butylthio-6-nitrocyclotetradecane
(48) 1-propyl-5-nitrocyclotetradecane Isomers and mixtures of the above-mentioned nitrocycloalkanes and substituted nitrocycloalkanes may be utilized as well as homologues and other related compounds. Generally, the nitrocycloalkanes employed will contain between about 3 and about 22 carbon atoms and preferably will have between about 4 and about 14 carbon atoms.

The process of this invention can be operated to give satisfactory yields in the absence of a solvent, however, under certain processing conditions improved overall yields can be achieved when an inert solvent is employed. Useful inert solvents include, for example, aromatic hydrocarbons, such as benzene, toluene, xylene, etc.; halogenated aliphatic and aromatic hydrocarbons such as tetrachloroethylene, monochlorobenzene, dichlorobenzene, α-chloronaphthylene, perchloroethylene, sulfur dioxide, mixtures thereof and the like. The quantity of the particular solvent utilized is not critical and may be varied over a wide range. Generally, from about 3 to about 20 moles of the solvent will be employed per mole of the starting nitrocycloalkane, but lesser or larger amounts of solvent may be employed.

As previously stated, the catalyst utilized in the process of this invention is a carbonyl of iron, cobalt, nickel, or of an element of Group V–B or VI–B of the Periodic Table. Vanadium, niobium, tantalum, chromium, molybdenum and tungsten are the elements included in Groups V–B and VI–B of the Periodic Table. Examples of suitable carbonyl compounds include (A) the simple metal carbonyls, such as:
$V(CO)_6$      $W(CO)_6$
$Cr(CO)_6$      $Fe(CO)_5$
$Mo(CO)_6$      $Ni(CO)_4$ (B) polynuclear metal carbonyls, such as:
$Fe_2(CO)_9$
$Co_2(CO)_8$ (C) metal carbonyl halides, such as:
$Fe(CO)_5Br_2$      $Fe(CO)_2I_2$
$Fe(CO)_5Cl_2$      $Fe(CO)_2Br_2$
$Fe(CO)_5I_2$      $Fe(CO)_2I$
$Fe(CO)_4Cl_2$      $Fe(CO)_2Br$
$Fe(CO)_4I_2$      $Co(CO)I_2$
$[Fe(CO)_3Br_2]_3$      $Fe(CO)_4ICl$
$[Fe(CO)_3Cl_2]_3$      $Fe(CO)_4IBr$ (D) metal carbonyl hydrides, such as:
$H_2Fe(CO)_4$
$HCo(CO)_4$
$H_2Fe_3(CO)_{11}$ (E) metal carbonyl nitrosyls, such as:
$Fe(CO)_2(NO)_2$
$Co(CO)(NO)_2$
$Fe(CO)_2NO$ (F) inorganic and organic complexes and derivatives of the metal carbonyl compounds previously mentioned, such as:
$V(CO)_6 \cdot PF_3$      $C_6H_6Cr(CO)_3$
$Cr(CO)_6 \cdot NH_3$      $C_5H_5V(CO)_4$
$Fe(CO)_5 \cdot PF_3$      $C_5H_5Co(CO)_2$
$Fe(CO)_5Br_2 \cdot NH_3$      $(C_5H_5Mo(CO)_3)_2$
$V(CO)_6 \cdot (C_6H_5)_3P$
and (G) salts of metal carbonyls, such as:
$Na[Co(CN)(CO)_3]$      $K[Ni(CN)(CO)_3]$
$Na[Ni(CN)(CO)_3]$      $Li[Ni(CN)(CO)_3]$
$Na[Ni(CN)_2(CO)_2]$      $Li[Co(CN)(CO)_3]$
$K[Ni(CN)(CO)_3]$      $Na(C_6H_{14}O_3)_2V(CO)_6$ All of the carbonyl catalysts of the metals enumerated above are useful in the process of this invention, however, it has been found that the carbonyls of molybdenum, vanadium, chromium and iron are especially effective.

The metal carbonyl compounds employed as catalysts in the process of this invention which includes both liquids and solids, can be used in the pure state. The solid materials can be utilized in any convenient form from in sufficient subdivision to provide an adequate surface, such as in granular, powdered, pelleted or crushed form. Also, it has been found that under certain reaction conditions improved reaction rates are obtained when the solid metal carbonyls are extended upon inert supports.

A satisfactory procedure for preparing a supported catalyst that can be used in practicing this invention involves deposition of a normally solid metal carbonyl from an organic solvent solution onto the supporting material. For example, a solution of the metal carbonyl in an aromatic hydrocarbon can be sprayed onto the desired carrier or the carrier can be immersed in a quantity of the hydrocarbon solution of the metal carbonyl in a suitable vessel. The deposited catalyst can then be dried at a temperature of about 80 to about 120° or higher to drive off the aromatic solvent and form a layer of the desired carbonyl compound on the support. Any of the well known catalyst supports can be utilized including gamma alumina, any of the various silica-aluminas, activated clays, bauxite, silica, carbon, barium sulfate, calcium carbonate, asbestos, bentonite, fullers earth, etc. The supported catalyst can be used in the form of powder or pellets depending upon the type of reaction to be utilized. The use of pellets of approximately ⅛″ size has proven to be surprisingly satisfactory in continuous flowing stream procedures, since this catalyst does not tend to wash out of the system in the flowing stream.

The reaction is conducted in the presence of a catalytic proportion of the metal carbonyl catalyst. Usually between about 0.005 to about 0.5 mole of catatlyst are employed per mole of the starting nitrocycloalkane and preferably between about 0.01 to about 0.1 mole of the catalyst are utilized on the same basis. However, greater or lesser proportions of the catalyst may be utilized, if desired.

The exact role played by the metal carbonyl catalyst is not known, however, it has been discovered that during the reaction there is some destruction of the carbonyl compound. The catalyst can be added as a single slug or it can be added intermittently or continuously.

The order of mixing of the reactants is not critical and may be varied widely according to the limitations of the equipment employed. In one embodiment, the carbon monoxide is simply bubbled into the nitrocycloalkane dissolved in a suitable solvent, such as benzene, and containing the metal carbonyl catalyst. In carrying out the reaction at superatmospheric pressure in suitable pressure vessels, such as an autoclave or a high pressure continuous flow system, the carbon monoxide under pressure may be fed directly into the autoclave or tubular reactor.

A wide variety of apparatus can be employed in conducting the process described herein. For example, with atmospheric pressure reactions, the usual conventional closed kettles may be employed while at superatmospheric pressures, rocking-type as well as stirred autoclaves and tubular reactors may be employed. Preferably, some form of agitation, such as stirring, is supplied even when operating at atmospheric pressure. The process can be carried out batchwise, semi-continuously or continuously, as desired.

Continuous flow systems can be advantageously employed especially where the reaction is carried out under conditions which will cause turbulent flow at Reynolds numbers of from about 5000 to about 100,000 and preferably in the range between about 10,000 to about 100,000. Any suitable method of carrying out mixing which will give this Reynolds number is satisfactory. Generally, a continuous flow reactor constructed of steel tubing of small diameter, such as a quarter-inch inside diameter, through which the reactants and the catalyst are forced, can be operated with conventional high-pressure pumping equipment to produce the required high state of turbulence in the mixing zone. Jacketed tubing may be provided to cool or heat the reaction mixture, as required, and suitable valves are present so that the turbulent reaction mixture may be continuously drawn-off to a separation device such as a filter where any solids present are removed. The reaction mixture is then sent to a recovery unit, which can consist of appropriate distillation or extraction units for recovery of the products.

Carbon monoxide can be fed into the reactor or reaction system either intermittently or continuously as the reaction progresses. The total amount of carbon monoxide added during the reaction generally will be between about 0.5 and about 100 moles and, preferably, between about 1.0 and about 10 moles per mole of the starting nitrocycloalkane. If desired, greater or lesser amounts may be utilized. Unreacted carbon monoxide may be recycled to the reaction system to reduce the overall consumption and increase the efficiency of the process.

The carbon monoxide utilized as a reactant in this invention may be introduced into the reaction system as a gas or a liquid. Although usually in carrying out the process of this invention the pressure required is achieved through the use of the carbon monoxide alone, if desired a mixture of carbon monoxide and inert diluent gas, such as nitrogen may be employed. An inert diluent gas is one which is inert to all constituents of the reaction mixture under reaction conditions.

Although the process of this invention in which a nitrocycloalkane is reacted with carbon monoxide in the presence of the catalyst of this invention gives substantial yields of the lactams, it has been found that depending upon conditions employed in carrying out the reaction that some cycloalkane ketone is at times formed along with the caprolactam. At the conclusion of the reaction, the reaction mixture resulting from the operation of this process may, after removal of the catalyst, be sent to appropriate separation systems, such as distillation towers, in which the unreacted nitrocycloalkane and the cycloalkane ketone can be separated from the lactam. The cycloalkane ketone and the caprolactam can also be recovered from the reaction mixture by extraction with suitable solvents.

Various processes exist in the art for the conversion of cycloalkane ketones to the corresponding oxime, such as by treatment with hydroxylamine. In turn, the thus derived ketoxime can, by Beckmann rearrangement, be converted to the desired lactam.

The following examples illustrate specific embodiments of this invention and are to be considered not limitative:

EXAMPLE I

Nitrocyclohexane, 33.2 g. (0.25 mole), and 2.7 g. (0.01 mole) of molybdenum hexacarbonyl catalyst were charged to a 100 ml. round bottom flask. The flask was equipped with a carbon monoxide inlet tube, a magnetic stirrer, a condenser and an outlet tube connected to a burner. During the reaction period, carbon monoxide was bubbled continuously through the reaction mixture, while the flask and contents were heated by means of a heating mantle. After 30 minutes, the measured temperature was 97° C. and after 45 minutes the reaction mixture had turned green in color. Infrared analysis of a sample taken at this point showed a trace of cyclohexanone and indicated that some destruction of the metal carbonyl was taking place. The infrared spectrum of a sample taken after 2 hours indicated the presence of cyclohexanone and some caprolactam. The reaction was terminated at the end of 18 hours. Vapor phase chromatographic as well as mass spectrometric analyses of the reaction mixture indicated that it contained 20.5 percent by weight of cyclohexanone, 69.8 percent by weight of nitrocyclohexane, and 9.7 percent by weight of caprolactam.

EXAMPLE II

In this example, nitrocyclohexane 33.2 g. (0.25 mole), and 2.7 g. (0.01 mole) of molybdenum hexacarbonyl catalyst were reacted in the same apparatus as utilized in Example I. First, the reaction mixture was heated for 18 hours on a steam bath after which it was heated by means of a heating mantle at a temperature of 113° C. for 18 additional hours. At the conclusion of the reaction, it was determined by vapor phase chromatographic and mass spectrometric analyses that the reaction mixture contained 2.1 percent by weight of cyclohexanone, 1.7 percent by weight of caprolactam and 96.3 percent by weight of nitrocyclohexane.

Recovery of the caprolactam and cyclohexanone from the reaction mixture can be accomplished by first removing any solids present by filtration or centrifugation, following which the cyclohexanone, caprolactam and unreacted nitrocyclohexane can be recovered by distillation, preferably conducted under reduced pressure.

What is claimed is:

1. A process for preparing lactams which comprises reacting carbon monoxide with a nitrocycloalkane containing between about 3 and about 22 carbon atoms in the presence of a carbonyl of a metal selected from the group consisting of iron, nickel, cobalt, vanadium, niobium, tantalum, chromium, molybdenum and tungsten.

2. The process of claim 1 wherein the proportion of said carbonyl of a metal is between about 0.005 and about 0.5 mole per mole of said nitrocycloalkane.

3. The process of claim 1 wherein the reaction is conducted at a pressure ranging from about atmospheric to about 2000 p.s.i.g., and at a temperature ranging from about 20 to about 250° C.

4. The process of claim 3 wherein said nitrocycloalkane contains between about 4 and about 14 carbon atoms.

5. The process of claim 4 wherein said nitrocycloalkane is nitrocyclohexane and said lactam is caprolactam.

6. The process of claim 5 wherein carbonyl of a metal is a carbonyl of molybdenum.

7. The process of claim 6 wherein said carbonyl of a metal is $Mo(CO)_6$.

8. The process of claim 4 wherein the reaction is carried out in the presence of an inert solvent.

9. The process of claim 8 wherein said inert solvent is benzene.

References Cited

UNITED STATES PATENTS

| | | | |
|---|---|---|---|
| 2,822,398 | 2/1958 | McClure | 260—586 |
| 3,215,712 | 11/1965 | Hübel | 260—586 |
| 3,260,730 | 7/1966 | Hübel et al. | 260—586 |

HENRY R. JILES, Primary Examiner

R. T. BOND, Assistant Examiner

U.S. Cl. X.R.

260—239, 294.7, 326.5